United States Patent
Hirano et al.

(10) Patent No.: US 7,145,492 B2
(45) Date of Patent: Dec. 5, 2006

(54) DATA MANAGEMENT METHOD

(75) Inventors: Hideyuki Hirano, Kawasaki (JP); Seigo Kotani, Kawasaki (JP); Shinji Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/559,259

(22) Filed: Apr. 27, 2000

(65) Prior Publication Data

US 2003/0177093 A1    Sep. 18, 2003

(30) Foreign Application Priority Data

May 27, 1999  (JP)  .................................. 11-147769

(51) Int. Cl.
*H03M 3/00* (2006.01)
(52) U.S. Cl. .................. 341/143; 708/313; 341/155; 341/122; 341/61; 341/110; 341/118; 341/120; 341/161; 375/222; 375/350
(58) Field of Classification Search ............... 341/61, 341/110, 118, 120, 155, 161, 143; 708/313; 375/222, 350
See application file for complete search history.

(56) References Cited

U.S. PATENT DOCUMENTS 6,233,684 B1 *   5/2001   Stefik et al. ................. 713/176

FOREIGN PATENT DOCUMENTS

JP    10-164550    6/1998

OTHER PUBLICATIONS

"Digital Watermarking and Tracking" Anonymous. (Jan. 26, 1998) http://www.webreference.com/content/watermarks/tracking.html retrieved online.*
Japanese Office Action issued by the Japanese Patent Office on May 6, 2005 in the Japanese Patent Application No. 11-147769 related to the present patent application (3 pages).

* cited by examiner

*Primary Examiner*—James A Reagan
(74) *Attorney, Agent, or Firm*—Staas & Halsey LLP

(57) ABSTRACT

A data management method that by encrypting and distributing digital content prevents copyright infringement, and that prevents authorization information for decrypting the encrypted digital content from being damaged or otherwise lost. Encrypted content 45 is prepared by encrypting digital content 11 with a content key 44. A portion of the digital content 11 is extracted as sample data 41. A secret key 46, by which the content key 44 is encrypted with user information 14, is embedded as invisible information into the sample data 41, thus preparing watermarked sample data 47. The watermarked sample data 47 is synthesized with the encrypted content 45 to form synthesized data 48. The synthesized data 48 is distributed.

29 Claims, 8 Drawing Sheets

DATA MANAGEMENT METHOD

BACKGROUND OF THE INVENTION

1. Technical Field

The present invention relates to data management methods; particularly, it relates to data management methods wherein digital content is encrypted with special access information and distributed.

2. Description of Related Art

Electronic data in computer program software and electronic publishing materials is vended stored on magneto-optical disks (MO), digital video disks (DVD), floppy disks (FD), mini disks (MD) and other recording media. Electronic data thus is generally easy to copy, and illicit copies are frequently made. That copyrights on the software vendor and publisher end will be infringed and considerably hinder profits is therefore a worry.

The situation is the same with electronic data containing still image data and motion picture data distributed via the Internet, CATV and other networks: illicit copies are made frequently, consequently damaging copyright holders' profits.

For protecting so-called digital content, such as electronic data stored on the recording media described above and electronic data distributed via the variety of networks, it has been the practice to encrypt the digital content using an encryption key, and the thus distributing the substantive data that has been encrypted.

Assuming, for example, that a user accesses a content distributor from his or her own personal computer, then downloads the digital content onto a hard disk, and thus uses the digital content: To start with, the user accesses a host computer and obtains a plug-in module for downloading. Thereafter, the user forwards, to the host computer, an in-use hard disk drive identification number, an in-use computer CPU identification number, and other identification information items unique to the user.

On the content distributor end, substantive data in which digital content is encrypted with a content key and authorization information in which the content key is encrypted with user-specific identification information, is sent to the user end.

On the user end, the encrypted substantive data that has been sent and the authorization information are recorded as is encrypted on the hard disk. When using the digital content, employing user-specific identification information such as the hard disk drive identification number, the authorization information is decrypted and the content key is thereby obtained. The digital content is decrypted with the content key and thus used.

Herein, when granting individual users the right to use the digital content, the encryption key for encrypting the digital content can be made common, and use privileges can be granted individually to users by encrypting a decryption key utilizing user-specific information different for every user.

Wherein data is distributed by the methods described above, the data distributor is required to forward separately the encrypted digital content and the authorization information serving as the decryption key for the encrypted digital content.

Further, on the user end, the encrypted digital content and the authorization information that have been forwarded have to be stored separately on the recording medium.

Consequently, if the authorization information is damaged during the course of being forwarded to the user end from the data distributor end, or if the authorization information is otherwise damaged or lost due to some mishap on the recording medium on the user end, the digital content will become unusable. This makes it necessary to go through a process for acquiring second-time authorization information.

SUMMARY OF THE INVENTION

An object of the present invention is to provide a data management method that by encrypting and distributing digital content prevents copyright infringement, and that prevents authorization information for decrypting the encrypted digital content from being damaged or otherwise lost.

A data management method according to the present invention comprises a step of preparing a substantive data file by encrypting a digital content to be distributed, a step of extracting a part of the digital content as sample data, and preparing sample data file by embedding, into the sample data, authorization information as invisible information containing information on a content key used as an encryption key when encrypting the digital content, and a step of preparing synthesized data by synthesizing the substantive data file with the sample data file.

When using the distributed digital content, this involves separating the authorization information from the sample data file, restoring the content key for decrypting the substantive data file from the authorization information, and decrypting the substantive data file into the original digital content by use of the content key for its use.

With this contrivance, the substantive data file is integrally synthesized with the authorization information embedded as the invisible information into the sample data file, thereby preventing a breakage and a loss of the authorization information for decrypting the substantive data file. The data of the digital content can be distributed by circulating the synthesized data, whereby the system can be downsized.

The sample data may be image data contained in the digital content, on which at least one of image processing, resizing, compressing and a γ-compensation is executed.

Further, the sample data may be index data representing the substantive data file.

Further, the synthesized data may contain a plurality of substantive data files based on a plurality of digital contents, a plurality of sample data files corresponding to the plurality of substantive data files, and each of the sample data constituting the plurality of sample data files may be linked to the corresponding substantive data file among the plurality of substantive data files.

Moreover, the sample data file may be defined as structured data based on JPEG (Joint Photographic Experts Group) and MPEG (Motion Picture Experts Group), and the synthesized data may be prepared by additionally synthesizing the substantive data file with the sample data file by use of a format of the sample data file.

The authorization information may be what the content key is encrypted in such a way that at least one of user identification information, identification information on a device incorporated into a computer employed by the user, identification information on a CPU mounted in the computer employed by the user and identification information peculiar to a recording medium for storing the digital content, serves as an encryption key. Further, the authorization information may also be what the content key is encrypted, with identification information common to a plurality of users serving as an encryption key. In addition, the authorization information may be what the content key is encrypted in such a way that at least one of identification information unique to a distributor of the digital content and identification information unique to an author of the digital content, serves as an encryption key.

The decryption key for decrypting the encrypted content key is common to the encryption key for executing the encryption, and may be a common key based on unique information transmitted and received between the user and the content distributor.

The distributor of the digital content may encrypt the content key by use of a secret key, and the user may decrypt the encrypted content key by use of a public key provided beforehand from the distributor of the digital content.

Furthermore, the sample data file may contain the number of times as invisible information with which the user uses the digital content, and the invisible information may be rewritten each time the user uses the digital content.

The sample data file may further contain authorization information as invisible information which makes it feasible to control the number of uses, and the invisible information may be rewritten when the user uses the digital content over a predetermined number of times.

In that case, the invisible information may be rewritten when reading the substantive data file after decrypting the same data file or when the use of the digital content is finished.

The invisible information of the sample data file contains redundant information and thereby incorporates an error recovery function.

The system may be constructed so that a range of regeneration based on the invisible information of the sample data file is regulated when decrypting the substantive data file. A range of any one category of years, months, dates and hours for which the regeneration can be done based on the invisible information of the sample data file is regulated when decrypting the substantive data file.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Outline of the Invention

Figure 1:
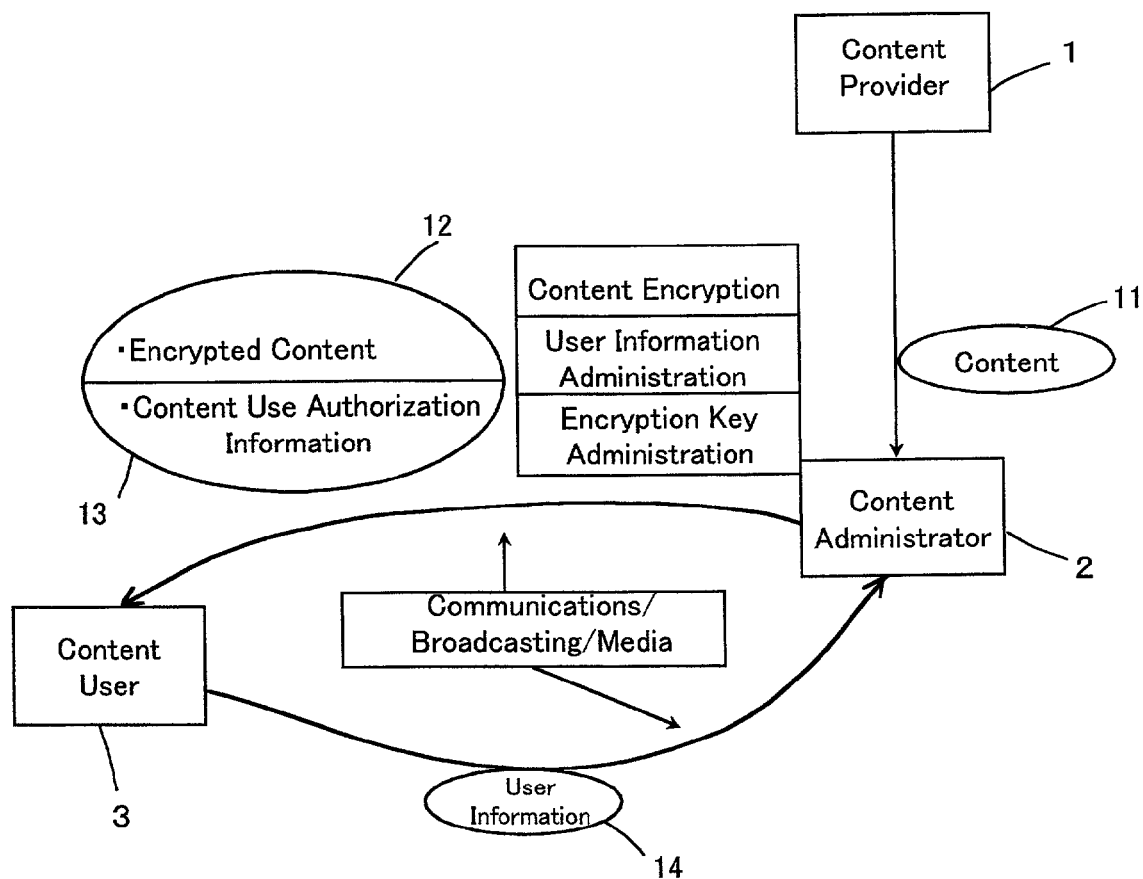
FIG. 1 is a schematic configurational diagram of the present invention.

FIG. 1 shows an outline of architecture according to the present invention.

A content provider 1 may be an author and a copyright holder of digital contents, and provides a content administrator 2 with a digital content 11 to be operated.

The content administrator 2 encrypts, for its operation, the digital content 11 provided from the content provider 1. The content administrator 2 manages an encryption key thereof and also manages user information of a user who utilizes the digital content 11.

A content user 3, when trying to use the digital content managed by the content administrator 2, transmits user information 14 to the content administrator 2.

The content administrator 2 manages the user information 14 transmitted from the content user 3, prepares content use authorization information 13 based on this item of user information 14, and transmits the authorization information 13 combined with an encrypted content 12 to the content user 3.

In this case, the content administrator 2 extracts such sample data as to represent its substance out of the digital content 11. The content administrator 2 encrypts the encryption key, by which the digital content 11 has been encrypted, with the user information 14, thereby preparing the content use authorization information 13. The content administrator 2 prepares a sample data file by embedding the authorization information 13 as invisible information into the sample data. Further, the content administrator 2 synthesizes this sample data file with the encrypted content 12, and transmits the synthesized content to the content user 3.

In that case, the content provider 1 may be identical in function with the content administrator 2.

Content Administrator

Figure 2:
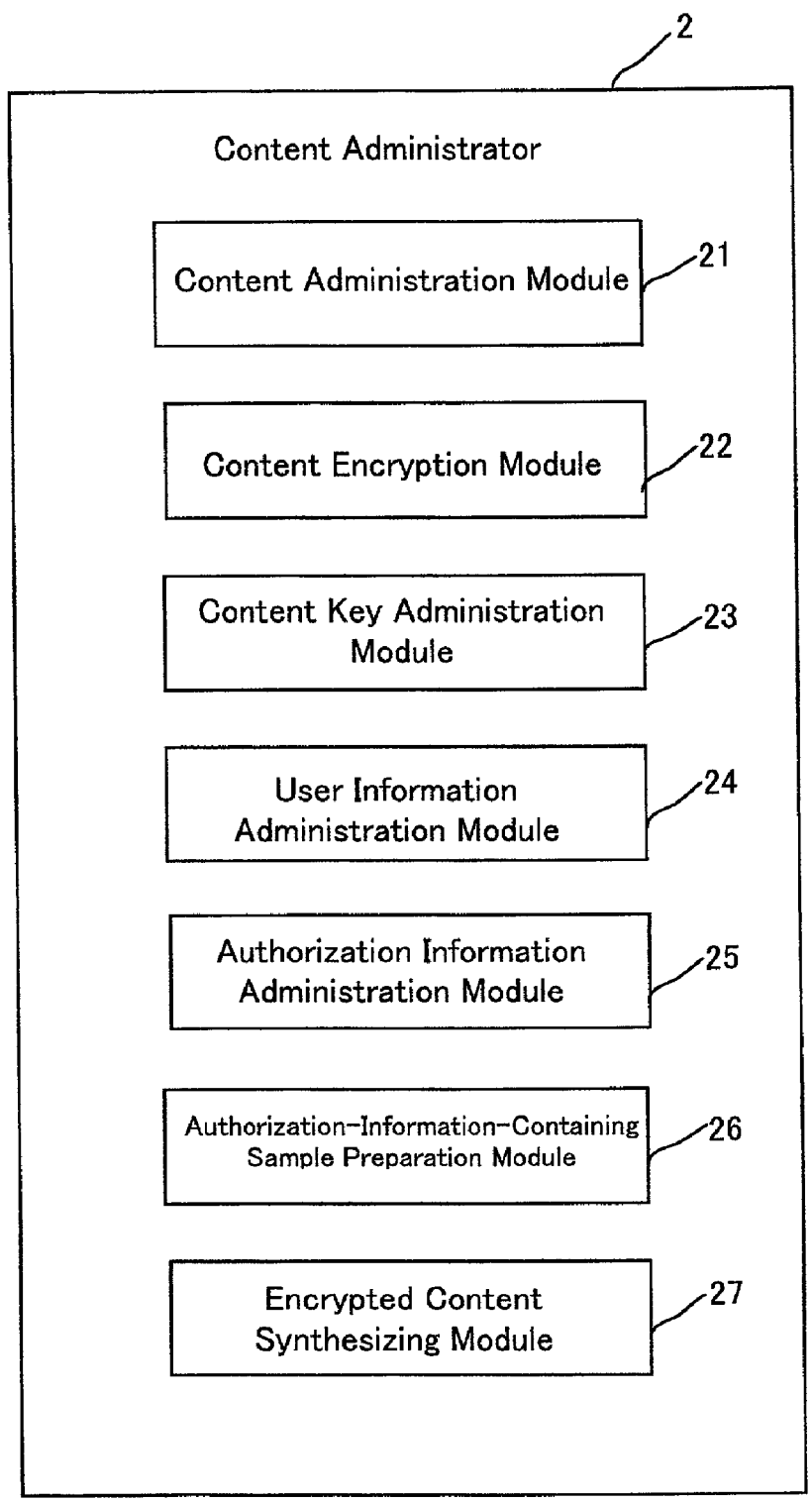
FIG. 2 is a schematic diagram of the configuration on the content administrator end.

Reference is made to FIG. 2, a functional block diagram schematically depicting configuration on the content administrator 2 end. The system on the content administrator 2 end includes: a content administration module 21 for managing the content to be run; a content encryption unit 22 for encrypting the digital content by use of predetermined content keys; a content key administration unit 23 for administrating content keys; a user information administration module 24 for obtaining the user information form a content user 3 and administrating this item of user information; an authorization information administration module 25 for preparing user authorization information for the digital content on the basis of the user information administered by the user information administration module 24 to administer the information; a authorization-information-embedded sample preparing unit 26 for extracting sample data from the digital content and embedding the authorization information as invisible information into the sample data; and an encrypted content synthesizing unit 27 for synthesizing the authorization information embedded sample data with the encrypted content encrypted by using the content key.

Content User

Figure 3:
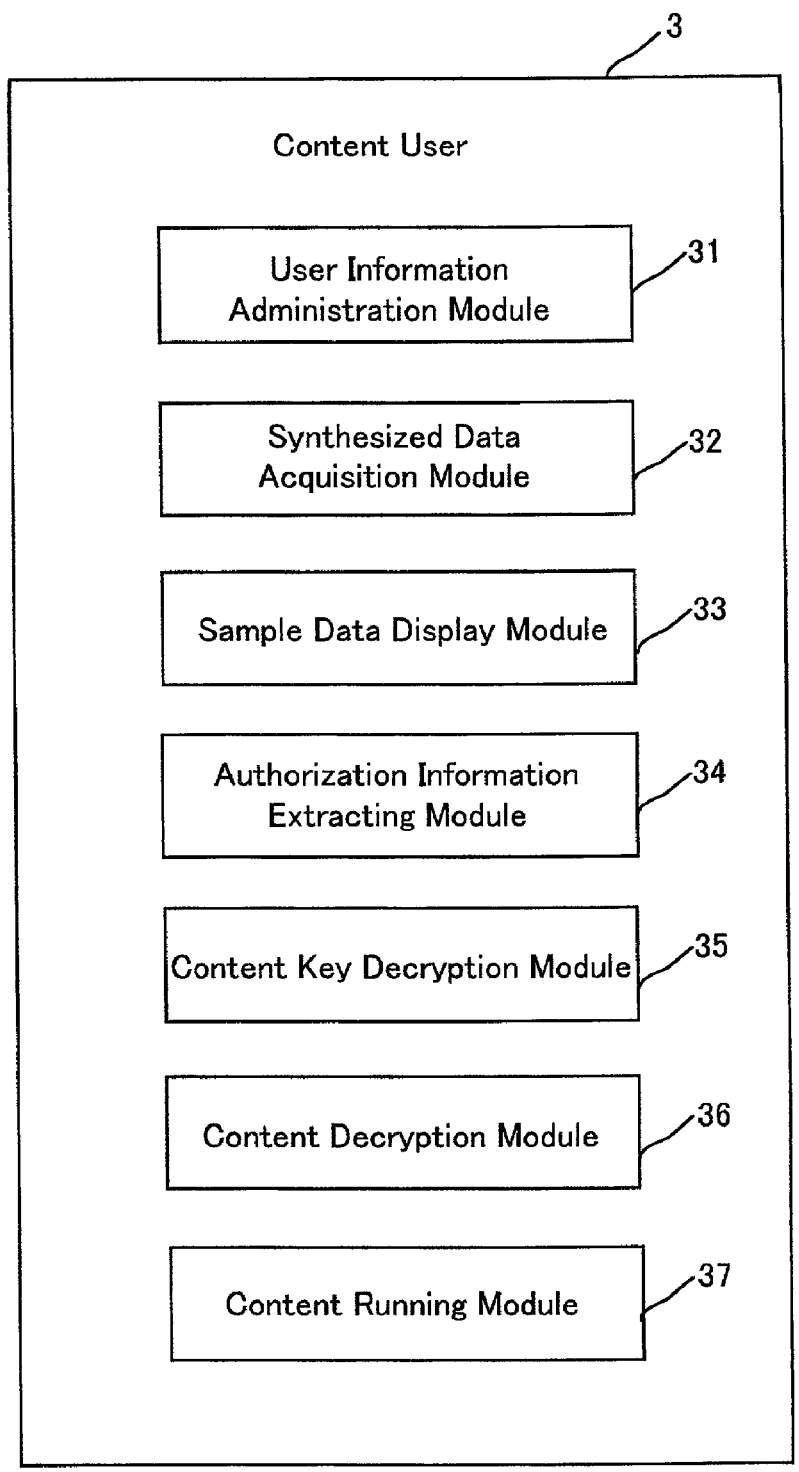
FIG. 3 is a schematic diagram of the configuration on the content user end.

Reference is made next to FIG. 3, a functional block diagram schematically showing a configuration on the side of the content user 3.

The system on the content user 2 end includes: a user information administration module 31 for managing identification numbers of in-use hard disk drives; an identification number of a CPU incorporated into a computer and other items of identification information unique to users; a synthesized data acquisition unit 32 for acquiring synthesized data from the content administrator 2; a sample data display unit 33 for displaying sample data from the acquired synthesized data; an authorization information extracting unit 34 for separating the authorization information from the authorization-information-embedded sample data; a content key decryption unit 35 for regenerating the content key by decrypting the extracted authorization information; a content decryption unit 36 for decrypting the encrypted content by use of the decrypted content key; and a content running unit 37 for running the decrypted digital content.

Distribution of Content

Figure 4:
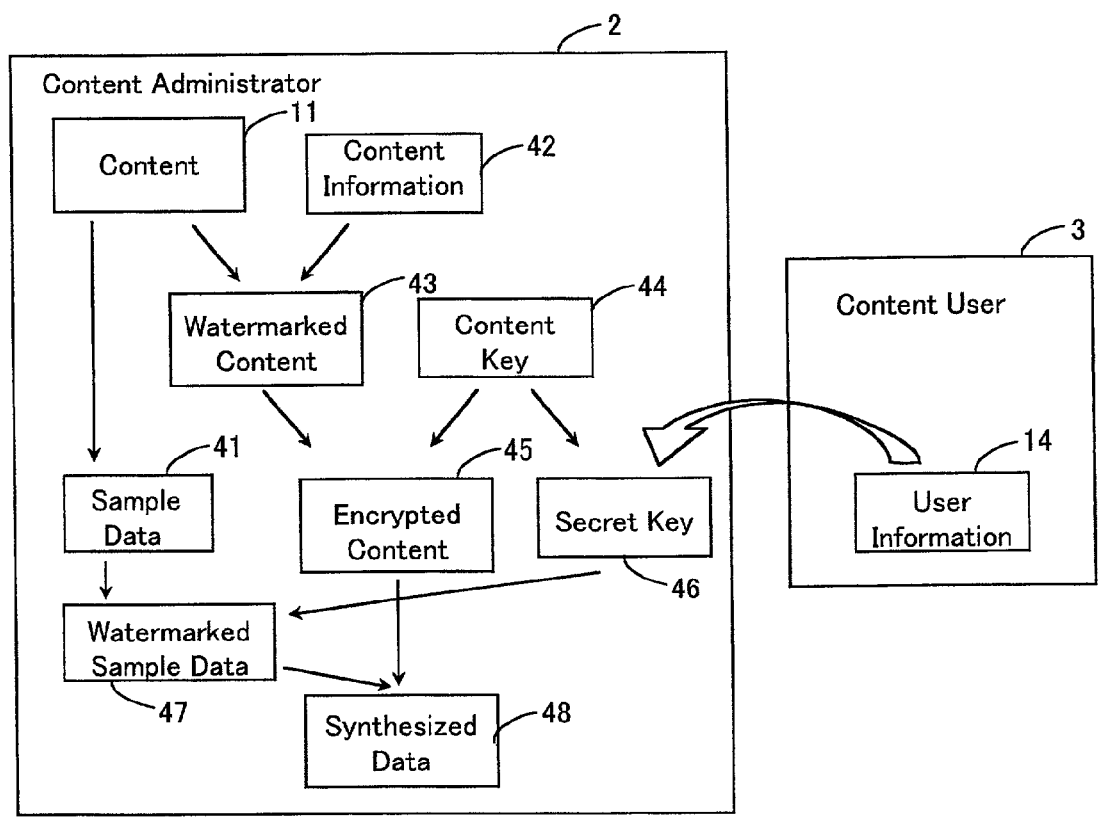
FIG. 4 is a theoretical depiction of an instance of content distribution.
Figure 5:
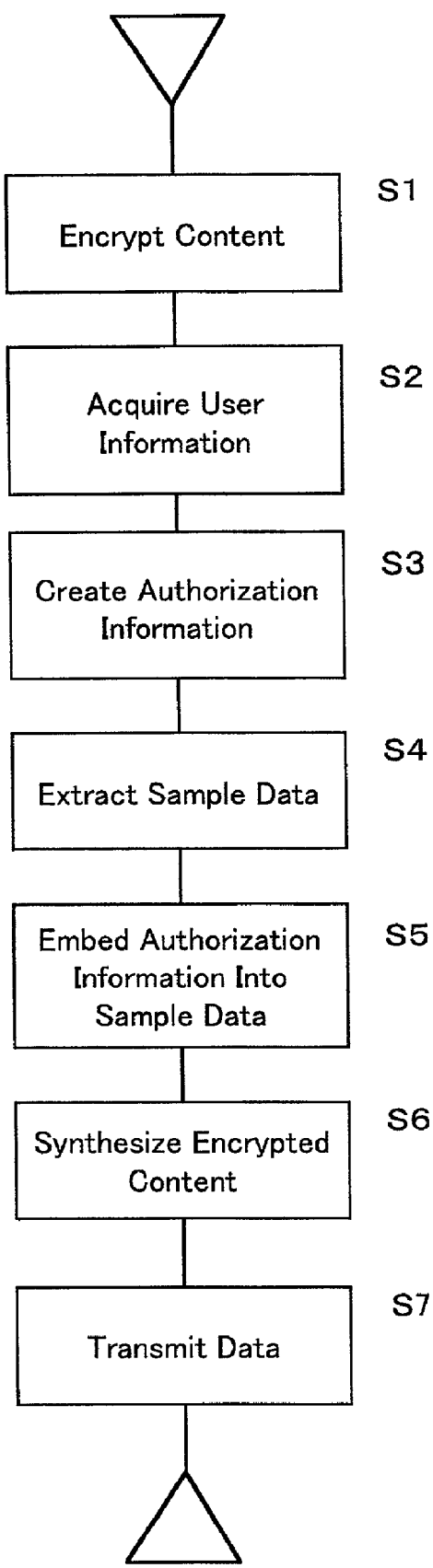
FIG. 5 is a flowchart of an instance of content distribution.

An operation performed by the content administrator 2 when distributing the digital content will be described based on FIG. 4 and 5.

The digital content 11, into which content information 42 thereof is embedded as a watermark, turns out to be a watermarked content 43. Herein, the content 11 may be structured so that the content information 42 is inserted into a specified frequency band of the data, and may also be structured so that a part of the data is thinned out and the content information 42 is inserted therein. The content information 42 may be set as, e.g., information on the copyright of the digital content 11, and the embedding of such an item of information may be omitted.

In step S1, the watermarked content 43 is encrypted by use of a content key 44, thereby preparing an encrypted content 45.

The user information 14 is acquired in step S2. Herein, if accessed from the content user 2, items of identification information unique to the content user 3 such as the identification number of the hard disk drive used by the content user 2 and the identification number of the CPU mounted in the computer, are transmitted and stored in the user information administration module 24 (see FIG. 2).

In step S3, the content key 44 is encrypted by using the acquired user information 14, and a secret key 46 is prepared. This secret key 46 is encrypted based on the user information 14 unique to the content user 3, and therefore serves as authorization information by which the digital content 11 is allowed to be used.

Data representing the content is extracted as sample data 41 out of the digital content 11 in step S4. If the digital content 11 contains plural items of image data, one item of image data among them may be extracted as the sample data 41. In the case of simultaneously operating the plurality of digital contents 11, the system can be constructed so that the sample data 41 extracted herein is linked to the digital content 11 corresponding thereto, and a desired item of sample data among plural items of sample data is selected, thus choosing the digital content to be used.

In step S5, the secret key 46 is embedded as a watermark into the sample data 41, thereby preparing watermarked sample data 47. The watermarked sample data 47 may be, as in the manner described above, structured so that the data of the secret key 46 is inserted into a specified frequency band of the data, and may also be structured so that a part of the data is thinned out and the data of the secret key 46 is inserted therein. With this design, it follows that there is prepared the authorization information embedded sample data into which the authorization information is embedded as invisible information.

Synthesized data 48 is prepared by synthesizing the encrypted content 45 with the watermarked sample data 47 in step S6.

In a case where the digital content 11 is composed of plural items of image data, the data may be distributed by setting the sample data in a structured data format based on a standards group such as JPEG (Joint Photographic Experts Group). In this case, the sample data 41 is paired with the digital content 11, and the authorization information is embedded therein per content, thus preparing the watermarked sample data 47. Then, the digital content 11 is additionally synthesized with the sample data 47.

Figure 8:
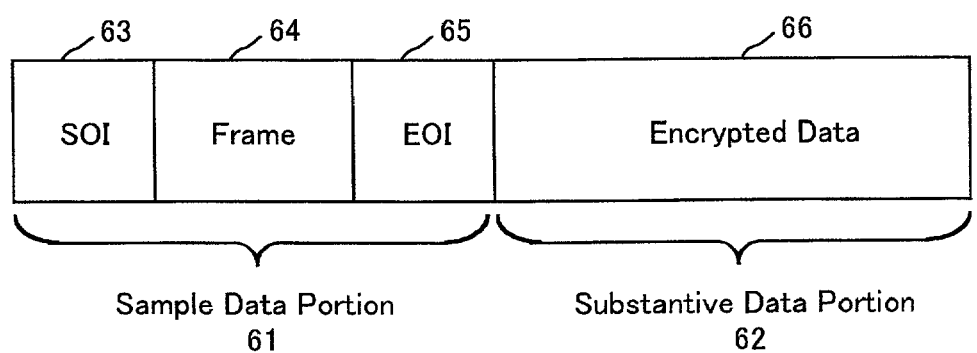
FIG. 8 is an explanatory diagram illustrating JPEG data structure.

FIG. 8 shows a JPEG data structure in that case. The watermarked sample data 47 is structured as a sample data file 61 consisting of a Start Of Image (SOI) point 63, an End Of Image (EOI) point 65, and a frame 64 interposed between the start point 63 and the end point 65. Further, a substantive data file 62 is configured by a digital content 66 encrypted by the content key 44, and this sample data file 61 and the substantive data file 62 are integrally synthesized.

The synthesized data 48 is transmitted in response to a request of the content user 3 in step S7. In the case of distributing the data via a variety of networks, it follows that the synthesized data 48 is transmitted via those networks but may also be distributed in a form of being recorded on a CD-ROM, a DVD and other recording media.

Use of Content

Figure 6:
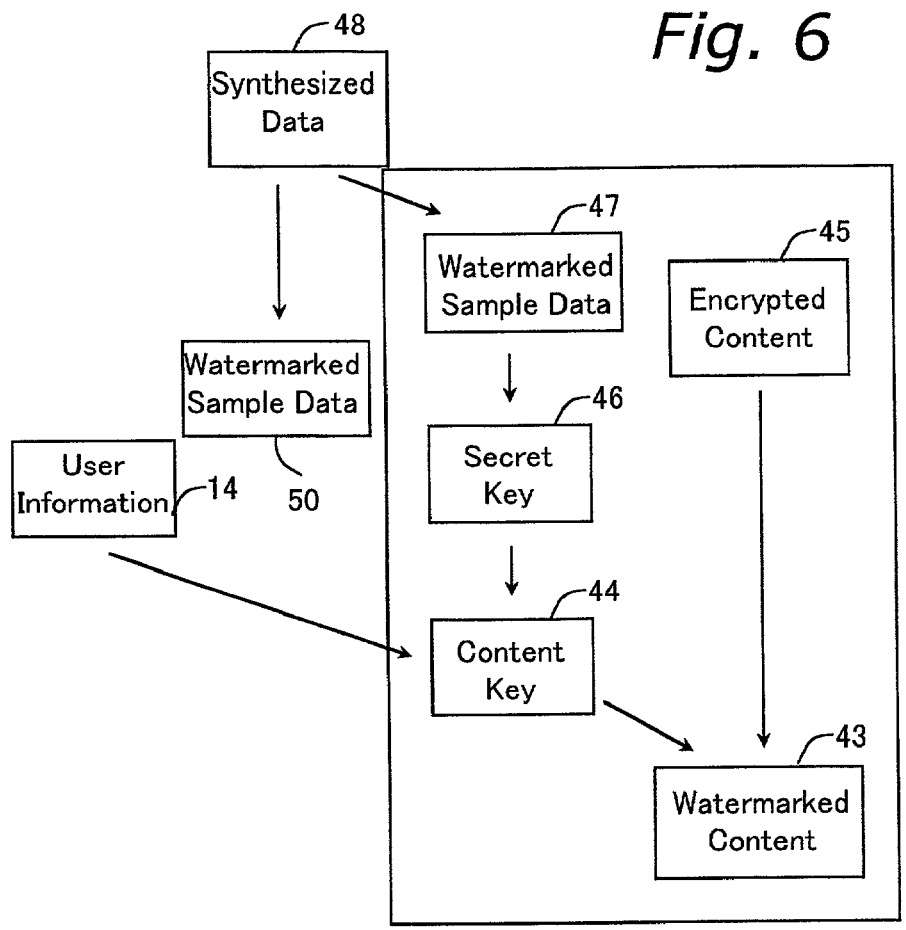
FIG. 6 is a theoretical depiction of an instance of content use.
Figure 7:
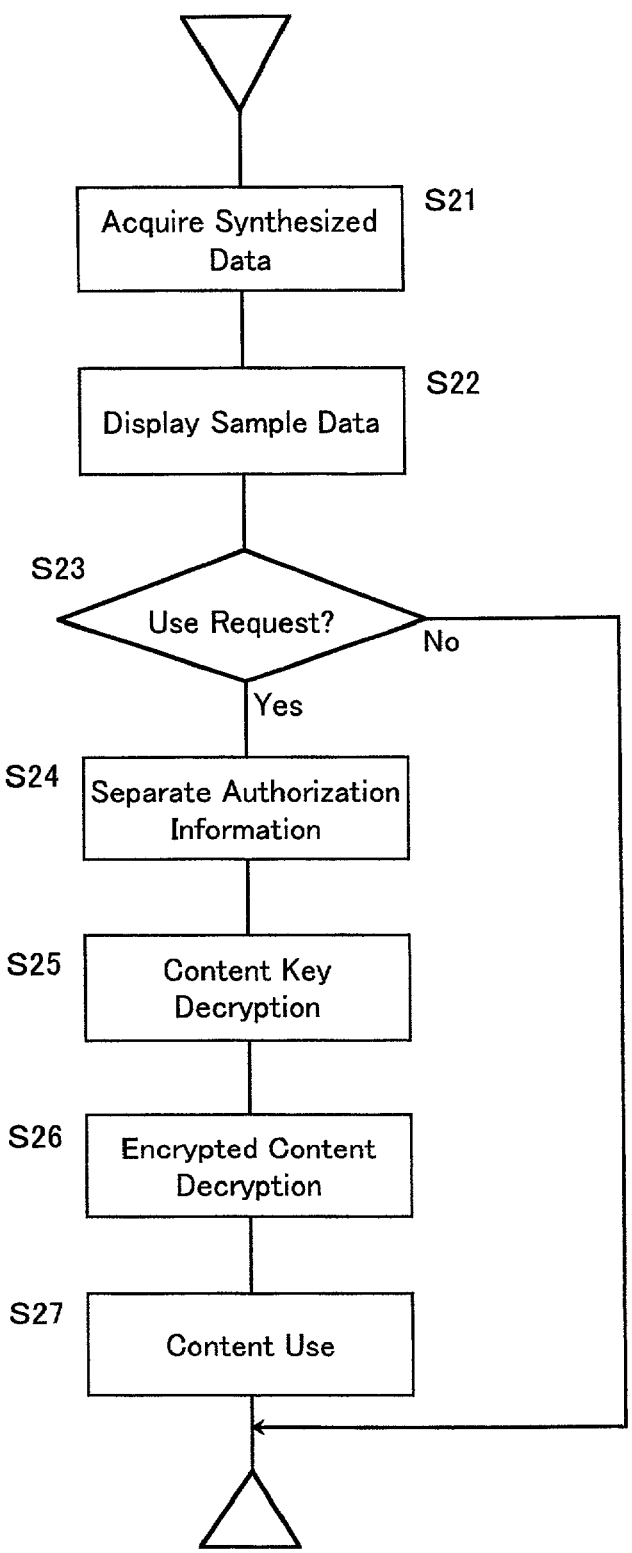
FIG. 7 is a flowchart for an instance of content use.

An operation in a case where the content user 3 uses the digital content distributed thereto, will be discussed based on FIG. 6 and 7.

The synthesized data 48 is obtained from the content administrator 2 in step S21. In that case, the content user 3 accesses beforehand the content administrator 2 and notifies the content administrator 2 of a purport that the user 3 uses the digital content managed by the content administrator 2, and it is assumed that the user information 14 unique to the user has been forwarded to the content administrator 2. The synthesized data 48 may take a form of its being obtained by downloading the data via the variety of networks, and may also take such a form as to be obtained through a distribution from the content administrator 2 in a state of being recorded on the recording medium. The synthesized data 48 obtained is stored on the hard disk and other recording medium employed by the content user 3.

In step S22, a watermarked sample data 50 in the synthesized data 48 is displayed. If the synthesized data 48 contains a plurality of digital contents, items of watermarked sample data 47 corresponding to the respective digital contents may be arranged in reduction and sequentially displayed by scrolling and switching, whereby a catalog display function can be given. Software of a client may be provided with this kind of function. Even when only one digital content exists within the synthesized data 48, the system may also be constructed so that the sample data file is structured by extracting some items of sample data and displayed in catalog. As a matter of course, in the case of a single item of sample data, the system may be constructed so that the single data is displayed as it is.

It is judged in step S23 whether or not there is a use request given from the content user 3. When the content user 3 selects a specified item of sample data and gives an indication of using the same data on the display of the watermarked sample data 50, the process flow goes to step S24, in which content using software is operated.

The authorization information is separated from the watermarked sample data 47 in the synthesized data 48 in step S24. Herein, the secret key 46 embedded as a watermark into the watermarked sample data 47, is de-embedded. If the secret key 46 is embedded as a frequency component of the sample data, the secret key 46 can be de-embedded by analyzing the frequency of the watermarked sample data 47. Further, in the case of implementing physical embedding such as embedding the watermark after thinning out the sample data, the secret key 46 can be de-embedded by performing an image analysis.

In step S25, the de-embedded secret key 46 is decrypted by use of the user information 14, the content key 44 is regenerated.

In step S26, the encrypted content 45 is decrypted by use of the regenerated content key 44, and the watermarked content 43 is developed on the hard disk and/or IC memory.

The content is utilized by actually operating the watermarked content 43 in step S27.

Mode of Data Operation

Figure 9:
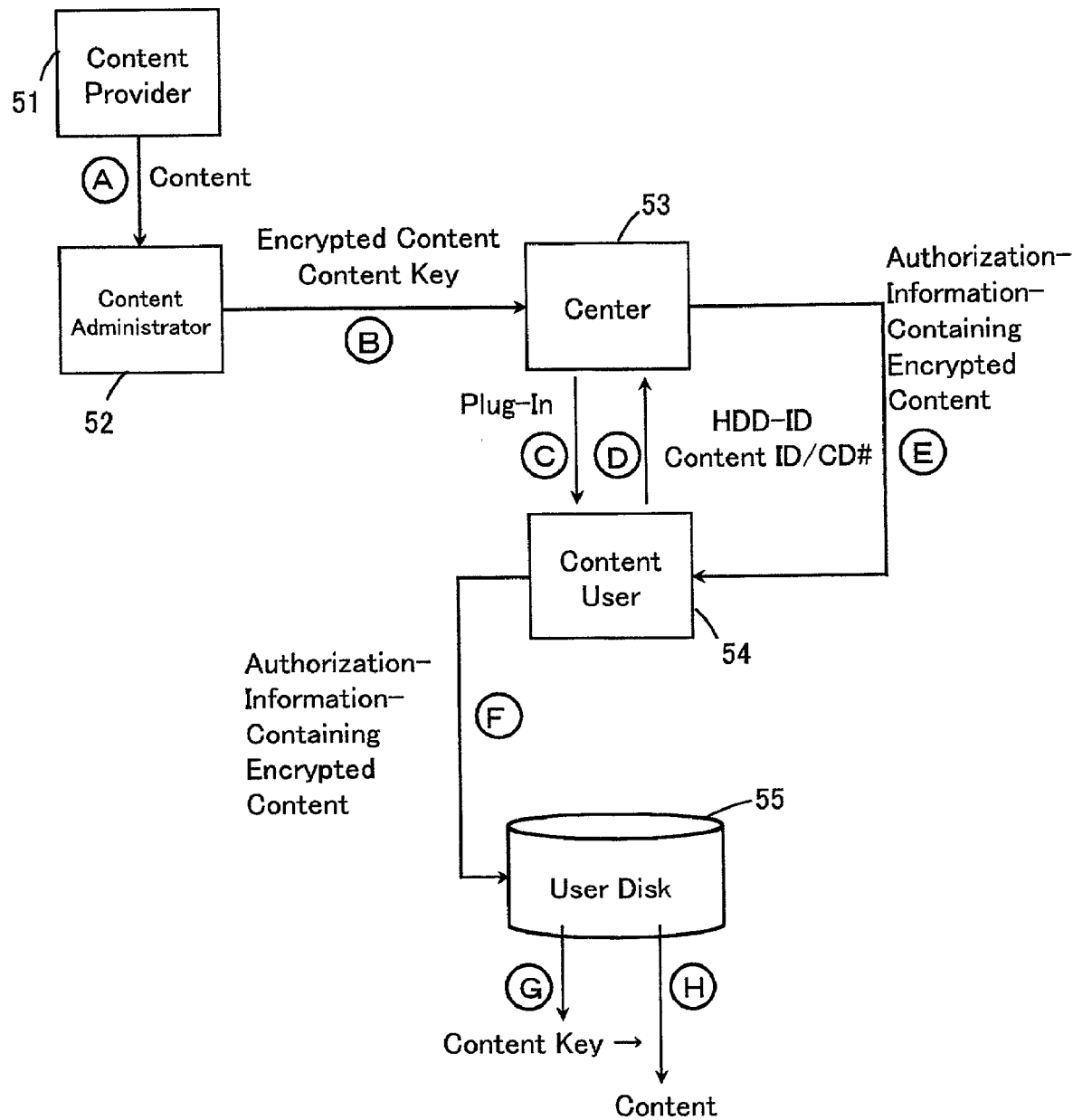
FIG. 9 is a configurational diagram illustrating an example of a management mode.

An operation mode as shown in FIG. 9 may be taken.

A content provider 51 may be an author and a copyright holder of digital contents, and provides a content administrator 52 with a digital content (A).

The content administrator 52 encrypts the digital content provided from the content provider 51 by use of a content key.

The content administrator 52 transmits the encrypted digital content and the content key to a center 53 for actually distributing the data (B). The center 53 manages the encrypted digital content and the content key. The center 53 may be a WEB server within the Internet and a variety of other networks, and is constructed so as to distribute the digital content in response to access from a user 54.

The user 54 accesses the center 53 via a WEB browser, and acquires a plug-in module for obtaining the data (C). The user 54 starts up the plug-in module on the WEB browser, and forwards to the center 53 identification information unique to the user such as an identification number of the hard disk drive employed by the user himself or herself (D).

The center 53 prepares the authorization information by encrypting the content key on the basis of the identification information unique to the user, and embeds the authorization information as a watermark into the sample data of the digital content. The center 53 then prepares a authorization information embedded encrypted content by synthesizing the sample data with the encrypted content. The center 53 transmits the authorization information embedded encrypted content to the content user 54 (E).

The content user 54 stores the received authorization information embedded encrypted content in a user's disk 55 such as a hard disk (F).

When utilizing the digital content, the content key is taken out of the authorization information embedded encrypted content stored in the user's disk 55 by use of the identification information unique to the user (G), and decrypts the encrypted content by the content key, thus taking out the digital content (H).

Such a system architecture being thus made, there is no necessity for changing the content key for encrypting the digital content for every content user, and one single content key suffices for one digital content, thereby facilitating the management of the encryption key. Further, a security of the authorization information is kept by the identification information peculiar to the content user, and a fraudulent use of the digital content can be prevented. Moreover, the authorization information is integrally embedded into the encrypted content, and hence the procedure of transferring and receiving the key is simplified, which might eliminate a possibility of the key for decrypting the encrypted content being lost or broken and is no time-consuming of reissuing the key.

OTHER EMBODIMENTS (A) The recording medium, stored with the synthesized data obtained by the content user 2, on which the synthesized data is decrypted and developed, may include, in addition to the hard disk, an MO, a ZIP, a DVD, an IC memory and those in other forms. In that case, IDs of those devices may be used as the user information 14.

(B) Further, in the case of such a mode that the digital content is recorded on the recording medium such as the CD-ROM and the DVD and thus distributed, a content ID and a medium identification number written within a package may also be sued as the user information 14.

(C) The system may also be constructed in such a way that the authorization information embedded into the watermarked sample data 47 contains a data field for recording the number of times with which the content user 2 decrypts and uses the digital content. In this case, if trying to use the content over a predetermined number of times, the system can be contrived to regulate this action. The system may also be constructed so that the number of times to use the content is updated when reading and decrypting the encrypted content or when finishing the use of the digital content, and, with this updated number serving as invisible information, the watermarked sample data 47 is rewritten.

(D) The system may be constructed in such a manner that the authorization information embedded into the watermarked sample data 47 contains a data field for recording the user information 14. In this case, an illicit copy of the digital content and a fraudulent circulation thereof can be prevented.

(E) The authorization information embedded into the watermarked sample data 47 may be structured as redundant information repeated a plurality of times. This enables the system to be given an error recovery function and makes it feasible to prevent a loss of the secret key 46 based on the authorization information.

(F) The authorization information embedded into the watermarked sample data 47 can be structured so as to regulate a range of any one category of years, months, dates and hours for which the regeneration can be done. In this case, the illicit cope of the digital content and the fraudulent circulation thereof can be prevented.

(G) The authorization information embedded into the watermarked sample data 47 can be structured so as to control the number of uses. In this case, the illicit cope of the digital content and the fraudulent circulation thereof can be prevented.

According to the present invention, the sample data filed containing the authorization information is integrally synthesized with the substantive data file of the encrypted digital content, and the synthesized data is distributed. Hence, there is no necessity for transferring and receiving the key for decrypting the substantive data file separately from the substantive data file. Further, the user does not have any necessity for managing the substantive data file and the key separately, and therefore it never happens that the key for decrypting the substantive data file is lost, with no time-consuming process of reissuing the key.

The authorization information is embedded as the invisible information into the sample data, and hence high security is maintained.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

The invention claimed is:

1. A data management method comprising:
   extracting a portion of a digital content file to be distributed to prepare a preview sample as an index to the digital content file for representing the digital content file;
   preparing a substantive file by encrypting the digital content file with a content key;
   preparing user specific authorization information by encrypting the content key based upon user information;
   preparing a user specific authorization information embedded preview sample by embedding the user specific authorization information, containing information for accessing the encrypted digital content file, as invisible information in the extracted preview sample;
   synthesizing the substantive file and the user-specific-authorization-information-embedded preview sample to prepare a synthesized digital content file; and
   distributing the synthesized digital content file.

2. The data management method set forth in claim 1, further comprising:
   enabling access to the synthesized digital content file by separating the user-specific authorization information from the preview sample; and
   restoring from the user-specific authorization information a decryption key as the content key for decrypting the substantive file.

3. The data management method set forth in claim 1, wherein the preview sample is image data contained in the digital content file and at least one process among image processing, resizing, compressing and a γ-compensation is executed on the image data.

4. The data management method set forth in claim 1, wherein the synthesized digital content file contains a plurality of substantive data files based on a plurality of digital content files, and contains a plurality of preview samples corresponding to the plurality of substantive data files; and wherein each preview sample is linked with respective corresponding ones of the plurality of substantive data files.

5. The data management method set forth in claim 1, wherein the preview sample is data structuralized in one of JPEG and MPEG formats, and
   the synthesized digital content file is prepared by add-on synthesizing the substantive file to the preview sample using the format of the preview sample.

6. The data management method set forth in claim 1, wherein in the preparing of the user-specific authorization information, the user information used in the encrypting of the content key is at least one of user identification information, equipment identification information loaded in user-employed computers, CPU identification information loaded in the user-employed computers, and identification information unique to digital-content-storing recording media.

7. The data management method set forth in claim 6, wherein a decryption key for decrypting the encrypted user-specific authorization information is common to an encryption key as the content key for encrypting the digital content file, the decryption key being a shared key based on exclusive information transmitted and received among users and content distributors, using symmetric cryptography.

8. The data management method set forth in claim 6, wherein digital content file distributors encrypt the content key employing a secret key as the user information, and the users decrypt the encrypted content key employing a public key provided in advance from the digital content file distributors, using public key cryptography.

9. The data management method set forth in claim 1, wherein in the preparing of the user-specific authorization information, the user information used in the encrypting of the content key is identification information common to a plurality of users.

10. The data management method set forth in claim 9, wherein a decryption key for decrypting the encrypted user-specific authorization information is common to an encryption key as the content key for encrypting the digital content file, the decryption key being a shared key based on exclusive information transmitted and received among users and content distributors, using symmetric cryptography.

11. The data management method set forth in claim 9, wherein digital content file distributors encrypt the content key employing a secret key as the user information, and the users decrypt the encrypted content key employing a public key provided in advance from the digital content file distributors, using public key cryptography.

12. The data management method set forth in claim 1, wherein in the preparing of the user-specific authorization information, the user information used in the encrypting of the content key is at least one of identification information unique to distributors of the digital content file, and identification information unique to authors of the digital content file.

13. The data management method set forth in claim 12, wherein a decryption key for decrypting the encrypted user-specific authorization information is common to an encryption key as the content key for encrypting the digital content file, the decryption key being a shared key based on exclusive information transmitted and received among users and content distributors, using symmetric cryptography.

14. The data management method set forth in claim 12, wherein digital content file distributors encrypt the content key employing a secret key as the user information, and the users decrypt the encrypted content key employing a public key provided in advance from the digital content file distributors, using public key cryptography.

15. The data management method set forth in claim 1, wherein the preview sample comprises as the invisible information a use count of times a user has used the digital content file; characterized in that the invisible information is rewritten each time a user uses the digital content file.

16. The data management method set forth in claim 15, characterized in that the invisible information is rewritten on decrypting and reading the substantive file.

17. The data management method set forth in claim 16, characterized in that the invisible information is rewritten when use of the digital content file is ended.

18. The data management method set forth in claim 15, wherein the invisible information in the preview sample comprises an error recovery function by containing redundant information.

19. The data management method set forth in claim 15, characterized in that limits on read-out and use in decrypting the substantive file are governed based on the invisible information in the preview sample.

20. The data management method set forth in claim 15, characterized in that one of year, month, date, and time limits within which read-out and use is possible in decrypting the substantive file are governed based on the invisible information in the preview sample.

21. The data management method set forth in claim 1, wherein the preview sample comprises as the invisible information authorization information to enable use count control; characterized in that the invisible information is rewritten when a user uses the digital content file a predetermined number of times and more.

22. The data management method set forth in claim 21, characterized in that the invisible information is rewritten on decrypting and reading the substantive file.

23. The data management method set forth in claim 21, characterized in that the invisible information is rewritten when use of the digital content file is ended.

24. A computer readable recording medium embodying data usable by a computer system, comprising:
a protected provider data file synthesized with an extracted accessible sample as an index to the provider data file for representing the provider data file, the sample having watermarked data-authorization information of the provider and data-authorization information of a recipient protecting the data-authorization information of the provider, to enable a recipient computer system to provide a preview function of the protected provider data file via the synthesized extracted accessible sample and to access the protected provider data file according to the synthesized extracted accessible sample having the watermarked data-authorization information of the provider and the recipient.

25. An apparatus, comprising:
a programmed computer processor encrypting a content file with a content key, preparing user specific content authorization information by encrypting the content key based upon user information, embedding user specific content authorization information as a watermark in an extracted accessible sample as an index to the content file for representing the content file and synthesizing the extracted accessible sample having the watermarked user-specific-content-authorization information with the encrypted content file.

26. A recording medium storing instructions to control a computer according to a process comprising:
encrypting a content file with a content key;
preparing user specific content authorization information by encrypting the content key based upon user information;
embedding the user specific content authorization information as a watermark in an extracted accessible sample as an index to the content file for representing the content file; and
synthesizing the extracted accessible sample having the watermarked user-specific-content-authorization information with the encrypted content file.

27. A recording medium useable by an apparatus to access digital data stored thereon, comprising:
a protected provider data file; and
an extracted accessible sample synthesized with the protected provider data file and usable by the apparatus, as an index to the provider data file for representing the provider data file, the sample having watermarked data-authorization information of the provider and data-authorization information of a recipient,
wherein the sample enables the apparatus to provide a sample function of the protected provider data file via the synthesized extracted accessible sample and enables the apparatus to access the protected provider data file according to the synthesized extracted accessible sample having the watermarked data-authorization information of the provider and the recipient.

28. An apparatus, comprising:
a content administrator to distribute a digital content file to a user according to a process comprising:
extracting a portion of the digital content file to be distributed to prepare a preview sample as an index to the digital content file for representing the digital content file,
preparing a substantive file by encrypting the digital content file with a content key,
preparing user specific authorization information by encrypting the content key based upon information of the user,
preparing a user specific authorization information embedded preview sample by embedding the user specific authorization information, containing information for accessing the encrypted digital content file, as invisible information in the extracted preview sample,
synthesizing the substantive file and the user-specific-authorization-information-embedded preview sample to prepare a synthesized digital content file, and
distributing the synthesized digital content file; and
a client apparatus to enable use of the distributed synthesized digital content file according to a process comprising;
receiving the distributed synthesized digital content file,
displaying for user selection the user-specific-authorization-information-embedded preview sample,
enabling user access to the synthesized digital content file by separating the user-specific authorization information from the preview sample, in response to a user selection of the user-specific-authorization-information-embedded preview sample,
restoring from the user-specific authorization information a decryption key as the content key, according to the user specific authorization information, and
decrypting the substantive file using the decryption key to enable access to the substantive file.

29. An apparatus, comprising:
a content administrator to encrypt a digital content file with a content key;
a center to manage the digital content file and the content key; and
a user client apparatus to perform a process comprising:
communicatively connecting to the center via a network, and
transmitting to the center identification information of a user to request the digital content file from the center,
wherein the center performs according to the user request a process comprising:
extracting a portion of the user requested digital content file to prepare a preview sample as an index to the digital content file for representing the digital content file,
preparing user specific authorization information by encrypting the content key based upon identification information of the user,
preparing a user specific authorization information embedded preview sample by embedding the user specific authorization information, containing information for accessing the encrypted digital content file, as invisible information in the extracted preview sample,
synthesizing the substantive file and the user-specific-authorization-information-embedded preview sample to prepare a synthesized digital content file, and
transmitting the synthesized digital content file to the user client apparatus.

* * * * *

UNITED STATES PATENT AND TRADEMARK OFFICE
CERTIFICATE OF CORRECTION

| | | |
|---|---|---|
| PATENT NO. | : 7,145,492 B2 | Page 1 of 1 |
| APPLICATION NO. | : 09/559259 | |
| DATED | : December 5, 2006 | |
| INVENTOR(S) | : Hideyuki Hirano et al. | |

It is certified that error appears in the above-identified patent and that said Letters Patent is hereby corrected as shown below:

Column 10, Line 44, change "claim 16," to --claim 15,--.

Column 12, Line 16-17, change "comprising;" to --comprising--.

Signed and Sealed this

Twenty-second Day of May, 2007

JON W. DUDAS
*Director of the United States Patent and Trademark Office*